C. Jillson,
Jaw Trap,
N° 16,335. Patented Jan. 6, 1857.

UNITED STATES PATENT OFFICE.

C. JILLSON, OF WORCESTER, MASSACHUSETTS.

MANUFACTURE OF ANIMAL-TRAPS.

Specification forming part of Letters Patent No. 16,335, dated January 6, 1857.

*To all whom it may concern:*

Be it known that I, C. JILLSON, of Worcester, in the county of Worcester and State of Massachusetts, have invented certain new and useful Improvements in Animal-Traps as an Article of Manufacture; and I do hereby declare the following to be a full, clear, and exact description thereof, reference being had to the accompanying drawings, making a part thereof, in which—

Figure 3:
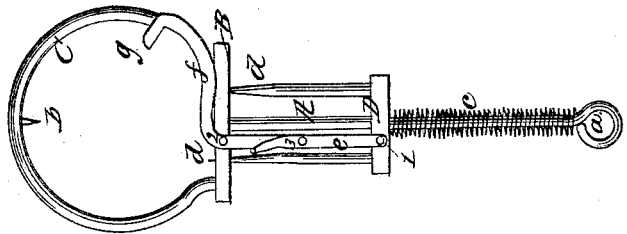
Figure 2:
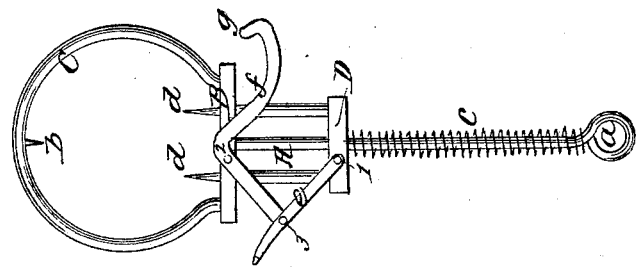
Figure 1:
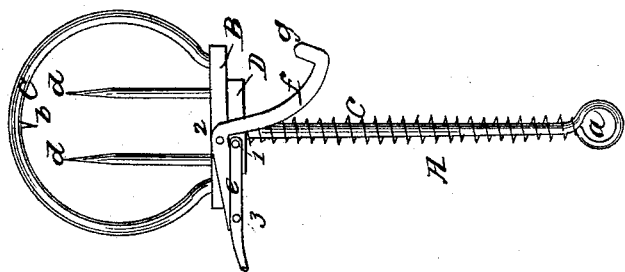

Figures 1, 2, and 3 represent the trap in different positions to show the action of its parts, the same letters of reference in the several figures denoting the same parts of the trap in all of them.

The nature of my invention relates to an animal-trap as a new article of manufacture, the particular manner of making which will be now described.

A is a shank, of metal, having a dead-eye $a$ in one of its ends, to which a string, cord, or chain may be attached to prevent the caught animal from dragging it away. On the opposite end of said shank is a cross-head B, in which is fitted or fastened a bow C, with a spur $b$ arranged in it. A sliding cross-head D is placed on the shank A below the permanent cross-head B, and a helical spring $c$ surrounds the shank and presses at one end against the sliding cross-head D and at the other end against the dead-eye $a$. Upon the cross-head D is placed the spear composed of sharp tines $d\ d$, which pass through holes made in the permanent cross-head B, and the sliding and permanent cross-heads D B are united by a toggle-trigger composed of the two levers $e\ f$, that $e$ being pivoted at 1 to the sliding cross-head D and the one $f$ pivoted at 2 to the permanent cross-head B, and the two levers $e\ f$ pivoted together, as at 3, so that the cross-head D is slid down the stem or shank A, as shown in Fig. 3, until the three pivoted points 1 2 3 come in the same line, or nearly so. The trap is set and the bent end $g$ of the lever $f$ projects within the ring or bow C, which ring is placed around or over the hole of the animal to be caught. The least outward pressure of the end $g$ throws the pivoted points 1 2 3 out of line and the recoil of the spring projects the spear toward the spur $b$, as seen in Fig. 1.

In Fig. 2 an intermediate position of the parts between the setting and springing points is shown, which clearly represents the whole trap and its action.

Having thus fully described the construction and operation of the trap, what I claim herein as new, and desire to secure by Letters Patent, is—

A new manufacture of animal-traps, composed of the several parts herein set forth, and operating as described.

C. JILLSON.

Witnesses:
G. A. JENKS,
FRED. CUTTING.